United States Patent [19]
Rogers et al.

[11] Patent Number: 5,379,797
[45] Date of Patent: Jan. 10, 1995

[54] HYDRAULIC FUSE

[75] Inventors: Russell L. Rogers, Munith; Gary M. Jenski, Jr., Jackson, both of Mich.

[73] Assignee: Aeroquip Corporation, Maumee, Ohio

[21] Appl. No.: 188,470

[22] Filed: Jan. 27, 1994

[51] Int. Cl.[6] .............................. F16K 17/30
[52] U.S. Cl. ................................ 137/503; 137/508
[58] Field of Search ............. 137/503, 508; 251/15

[56] References Cited

U.S. PATENT DOCUMENTS

| | | |
|---|---|---|
| 3,036,593 | 5/1962 | Saville ................. 137/508 X |
| 3,494,375 | 2/1970 | Henaughan . |
| 3,741,241 | 6/1973 | Jackson . |
| 4,383,549 | 5/1983 | Maldavs . |
| 4,436,111 | 3/1984 | Gold et al. . |
| 4,465,093 | 8/1984 | Gold et al. . |
| 4,655,245 | 4/1987 | Gellerson . |
| 4,665,942 | 5/1987 | Altman . |
| 4,699,166 | 10/1987 | Gold et al. . |
| 4,819,688 | 4/1989 | Field . |
| 4,962,786 | 10/1990 | Gellerson ............. 137/508 X |
| 5,137,054 | 8/1992 | Harper . |

FOREIGN PATENT DOCUMENTS

| | | | |
|---|---|---|---|
| 2334634 | 2/1974 | Germany ................ 137/503 |
| 603812 | 6/1948 | United Kingdom ......... 137/503 |

*Primary Examiner*—Stephen M. Hepperle
*Attorney, Agent, or Firm*—Emch, Schaffer, Schaub & Porcello Co.

[57] ABSTRACT

A hydraulic fuse includes cooperating inlet and outlet members within which are positioned a fixed guide having main flow ports and pressure detecting ports, an axially slideable sleeve mounted on the fixed guide and a spring yieldingly urging the slideable sleeve to a position leaving the main flow ports open. Upon the flow rate reaching an excessive level creating an excessive pressure drop, the slideable sleeve is urged forwardly against the biasing action of the spring to a position overlying and closing the main flow ports.

32 Claims, 4 Drawing Sheets

HYDRAULIC FUSE

DESCRIPTION

The present invention relates to a hydraulic fuse which permits the flow of fluid therethrough but which automatically closes when the flow rate of the fluid flowing therethrough exceeds a predetermined level.

In controlling the flow of fluids through a fluid delivery system, it is important to prevent fluid flowing through the system if the flow rate builds beyond a predetermined level. Such excessive flow rate can occur, for example, as a result of a failure in the system with a resultant increase in the rate of flow of fluid therethrough.

The prior art includes a number of types of hydraulic fuses, some of which may be characterized as rate fuses and others of which may be characterized as quantity fuses under which the fuse will serve to impede the flow of fluid after a predetermined quantity of fluid flows therethrough. The present invention is directed to the former type which is sensitive to the flow rate but is not quantity sensitive. Examples of prior art hydraulic fuses are included in the following U.S. Pat. Nos.: 3,494,375; 3,741,241; 4,383,549; 4,436,111; 4,465,093; 4,655,245; 4,665,942; 4,699,166; 4,819,688; 4,962,786 and 5,137,054.

DISCLOSURE OF INVENTION

Under the present invention, the fuse is placed in the conduit system and permits fluid to flow directly therethrough provided the flow rate does not exceed a predetermined level. If the flow rate of fluid flowing through the system exceeds the predetermined level as measured by a pressure drop across a specific portion of the fuse, the fuse will automatically close. The fuse of the present invention includes cooperating inlet and outlet members within which are positioned (1) a fixed guide having relatively large main flow ports and the pressure detecting ports, (2) an axially slideable sleeve mounted on the fixed guide and (3) a spring yieldingly urging the slideable sleeve to a position leaving the main flow ports open. If the flow rate exceeds the predetermined level, there will be created a pressure drop, detected through the pressure detecting ports, sufficient to move the slideable sleeve forwardly against the biasing action of the spring to a position overlying and closing the main flow ports. When the pressure drop is reduced, the spring will automatically urge the slideable sleeve to its rearward position thereby opening the main flow ports and permitting resumption of the flow of fluid through the hydraulic fuse.

BEST MODE OF CARRYING OUT INVENTION

Figure 1:
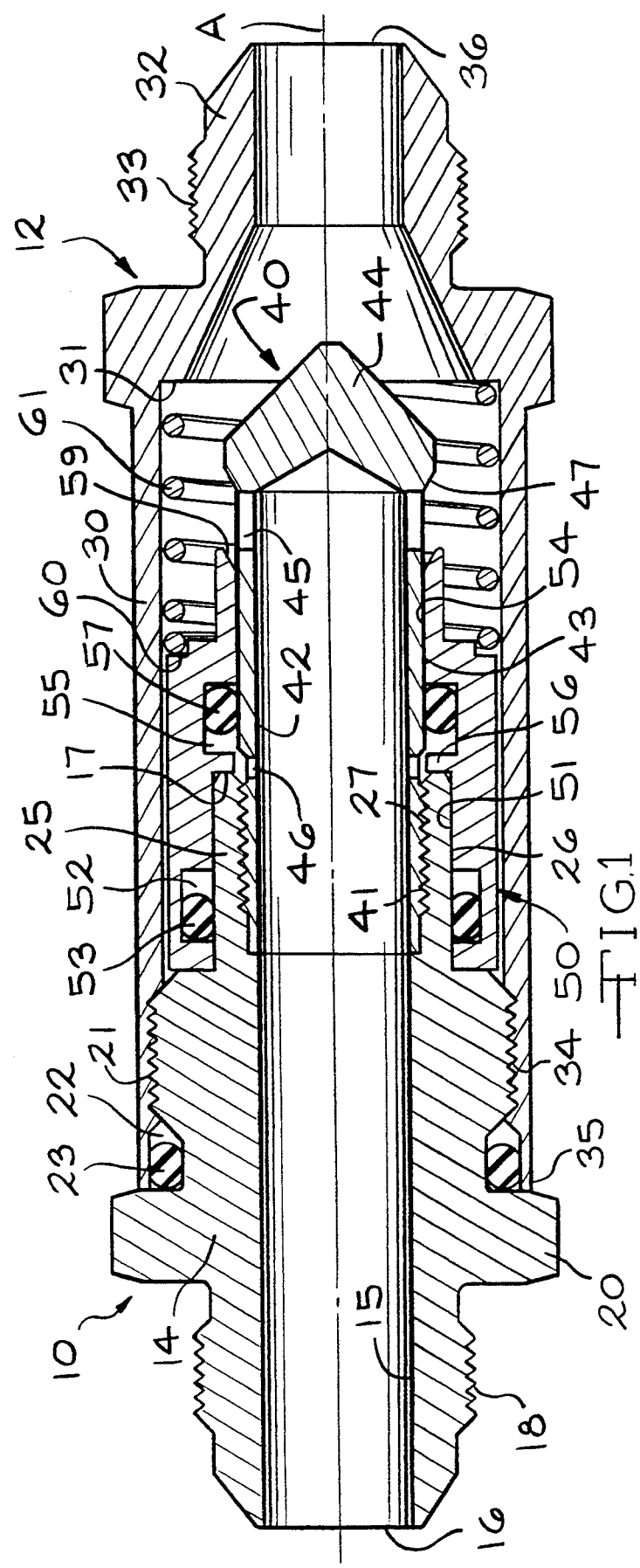
FIG. 1 is a longitudinal sectional view of the hydraulic fuse of the present invention showing the fuse in the open position.
Figure 2:
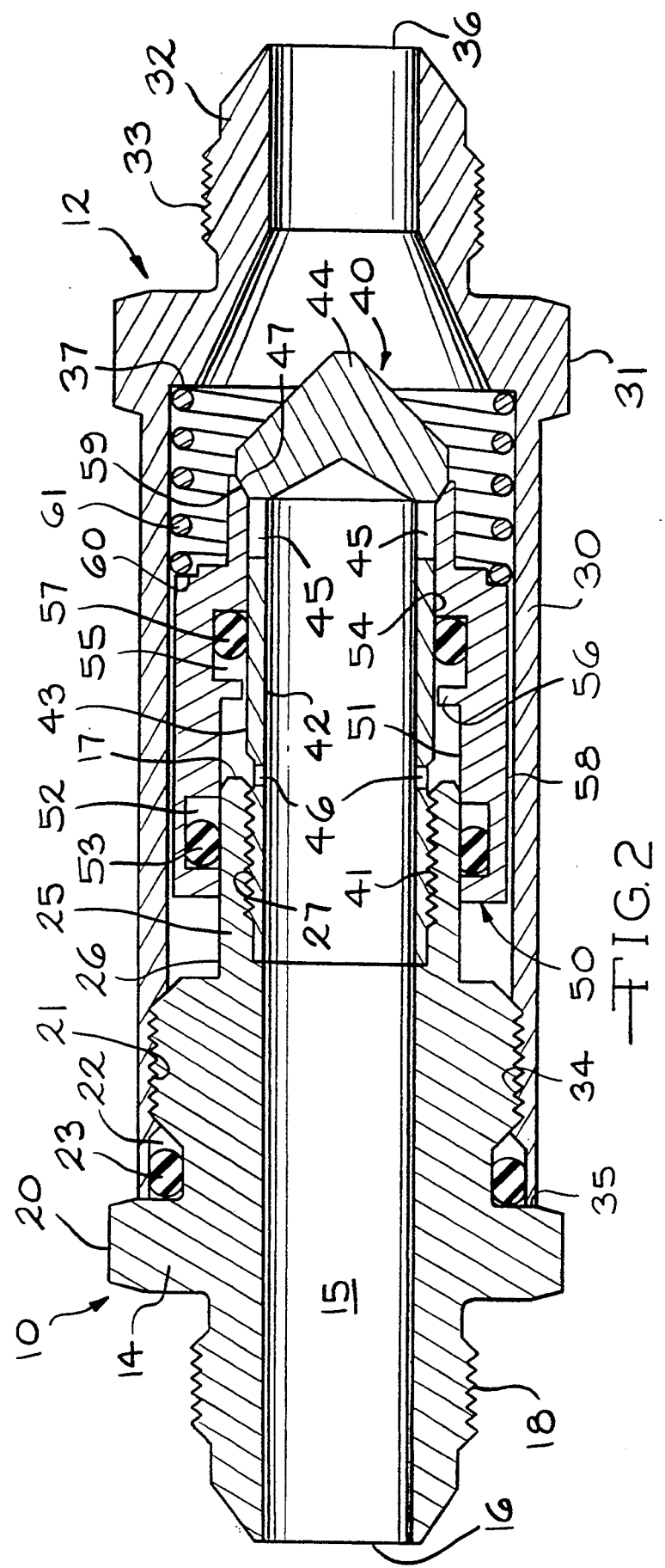
FIG. 2 is a view similar to FIG. 1 but showing the fuse in a closed position.

Referring now to FIGS. 1 and 2, the hydraulic fuse of the present invention includes an inlet member generally designated by the numeral 10 to which is secured an outlet member 12. The inlet member 10 includes a body portion 14 having a central passageway 15 extending along an axis A from an entrance end 16 to an exit end 17. Adjacent the entrance end 16, the body portion 14 is provided with external threads 18 for fastening to mating internal threads of a connector in the conduit fluid delivery system (not shown). A central area of the body portion 14 is provided with a radially enlarged portion defining a plurality of wrench flats 20. Downstream from the wrench flats 20 is an externally threaded section 21. An annular groove 22 within which is positioned an O-ring 23 is provided between the enlarged portion defining the wrench flats 20 and the externally threaded section 21. The body portion 14 terminates in a nose portion 25 having a cylindrical outer wall 26 and internal threads 27.

The outlet member 12 includes a cylindrical wall 30, an enlarged area defining wrench flats 31 and a connector end 32 having external threads 33 for fastening to a connector in the conduit system. The cylindrical wall 30 has an inlet end 35 abutting the enlarged portion of the inlet member body portion 14 defining the wrench flats 20. The inlet end 35 has a reduced wall thickness from other portions of the cylindrical wall 30. The inner surface of such reduced wall thickness portion sealingly engages the O-ring 23 in the annular groove 22. The cylindrical wall is provided with internal threads 34 which are secured to the externally threaded section 21 of the body portion 14 of the inlet member 10. The outlet member 12 has a central passageway extending along the axis A which terminates at an outlet end 36. The enlarged area defining the wrench flats 31 is provided with an internal shoulder 37.

Secured to the inlet member 10 is a fixed guide 40 having external threads 41 engaged to the internal threads 27 of the inlet member nose portion 25. The fixed guide 40 includes a wall having a cylindrical inner surface 42 defining an extension of the passageway 15 and a cylindrical outer surface 43 downstream from the external threads 41. The fixed guide 40 terminates in a solid tapered nose cone 44 defining an end to the passageway 15.

The fixed guide 40 has a plurality of outlet flow ports 45 adjacent the tapered nose cone 44. The outlet flow ports 45 are in substantially the same axial position and are disposed radially around the wall. As shown in FIGS. 1 and 2, there are two ports 45; however, there could be a greater number or lesser number of such outlet flow ports 45. The outlet flow ports 45 constitute the main flow path for fluid flowing from the passageway 15 to the outlet end 36. Accordingly, the size and number of such outlet flow ports 45 must be sufficiently great to permit the flow of the desired quantity of fluid per minute through the outlet end 36 at the desired pressure. The tapered nose cone 44 has a tapered abutment 47 adjacent the outlet flow ports 45 flaring outwardly and forwardly (to the right in the figures) therefrom.

Upstream from the outlet flow ports 45 are a plurality of pressure control ports 46. Preferably, there are the same number of pressure control ports 46 as there are outlet flow ports 45. As can be readily seen, the pressure control ports 46 have a significantly smaller diameter than the diameters of the outlet flow ports 45. For example, in one fuse, the fixed guide 40 had a cylindrical inner surface with a diameter of 0.391 inch +/−0.004 inch, two pressure control ports 46, each having a diameter of 0.047 inch and two outlet flow ports 45, each having a diameter of 0.219 inches.

Positioned in the space between the outlet member cylindrical wall 30 and the assembled nose portion 25 and fixed guide 40 is a slideable sleeve 50. The slideable sleeve 50 includes an enlarged diameter inner surface portion 51 adjacent its inlet end slidingly engaged to the cylindrical outer wall 26 of nose portion 25 and a reduced diameter inner surface portion 54 slidingly engaged to the outer cylindrical surface 43 of the fixed guide 40. The slideable sleeve 50 has an inwardly facing annular groove 52 in which is positioned an O-ring 53 which is sealingly and slideably engaged with the cylindrical outer wall 26.

The slideable sleeve 50 also has formed therein, in the reduced diameter inner surface portion 54, an annular groove 55 in which is positioned a second O-ring 57 which is sealingly and slideably engaged to the cylindrical outer surface 43 of the fixed guide 40. The slideable sleeve 50 has a radially inwardly directed annular flange 56 forming the rearward portion of the annular groove 55. The flange 56 preferably has an internal diameter slightly greater than the diameter of the reduced diameter inner surface portion 54 so that it is slightly spaced from the fixed guide cylindrical outer surface 43 when the slideable sleeve 50 is in the forward position shown in FIG. 2. The gap between the bore of the flange 56 and the cylindrical outer surface 43 preferably is in the range of 0.002 to 0.005 inch.

The slideable sleeve 50 is also provided with an outer surface 58 which preferably is spaced from the inner surface of the outlet member cylindrical wall 30 by a distance of approximately 0.008 to 0.010 inch. This spacing permits hydraulic fluid to flow out of the chamber between the members when the slideable sleeve is retracted from the forward position shown in FIG. 2 to the rearward position shown in FIG. 1 and to do so in a manner which prevents chattering of the slideable sleeve 50 during such movement.

The leading end of the slideable sleeve 50 has a tapered abutment 59 flaring outwardly and forwardly (to the right in the figures) at an angle which matches the tapered abutment 47 of the tapered nose cone 44. Thus, as can be seen in FIG. 2, when the slideable sleeve 50 is in its fully forward position, the tapered abutment 59 will sealingly engage the tapered abutment 47 of the tapered nose cone 44 thereby fully closing the outlet flow ports 45.

The slideable sleeve 50 is provided with a forward shoulder 60 adjacent the leading end and outer surface 58. A compression spring 61 is positioned between the forward shoulder 60 of the slideable sleeve 50 and the internal shoulder 37 of the outlet member 12. The compression spring 61 yieldingly urges the slideable sleeve 50 toward the fully open position shown in FIG. 1.

When the pressure drop exceeds the desired amount, the pressure from fluid communicating through the pressure control ports 46 will act upon the O-ring 57 thereby forcing the slideable sleeve 50 forwardly. Depending upon the amount of pressure, the sizes and numbers of the outlet ports 45, the size of the O-ring 57 and the biasing force developed by the compression spring 61, the slideable sleeve may be moved forwardly to a position partially closing the outlet ports 45 or, if such pressure is sufficiently great, will move forwardly to a position fully closing such ports 45 as shown in FIG. 2.

As will be appreciated, the pressure required to close the hydraulic fuse depends upon the strength of the compression spring 61 as measured by the pounds per square inch required to move the slideable sleeve 50 to a closed position and the differential area acting on the slideable sleeve 50, which differential area is the area of the cross-sectional size of the rear inner surface 51 minus the cross-sectional size of the forward inner surface 54. The number and size of the outlet ports 45 control the amount of pressure which will build up for a given rate of flow of fluid, i.e., gallons per minute. Thus, that differential area represents the effective area upon which pressure acting through the pressure control ports 54 will act upon in pushing against the O-ring 57.

Figure 3:
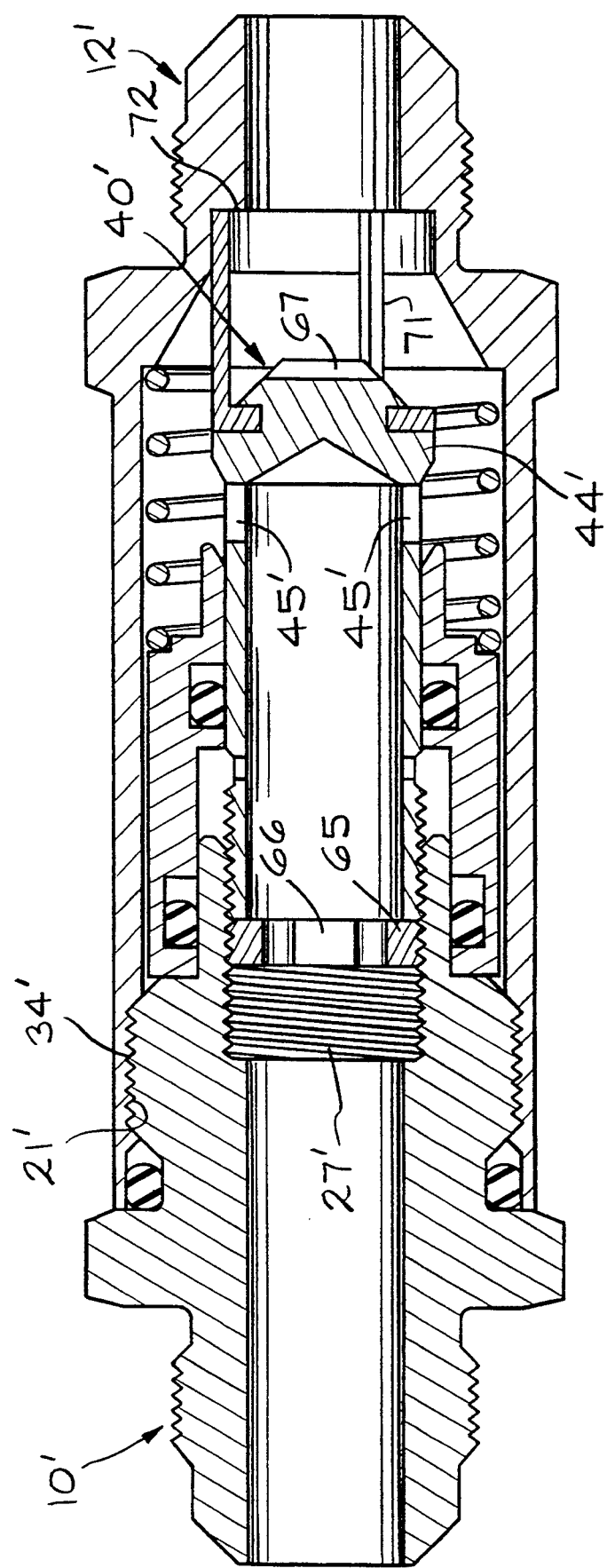
FIG. 3 is a sectional view of a modified embodiment incorporating an adjustable feature and showing the fuse in the fully open position.
Figure 4:
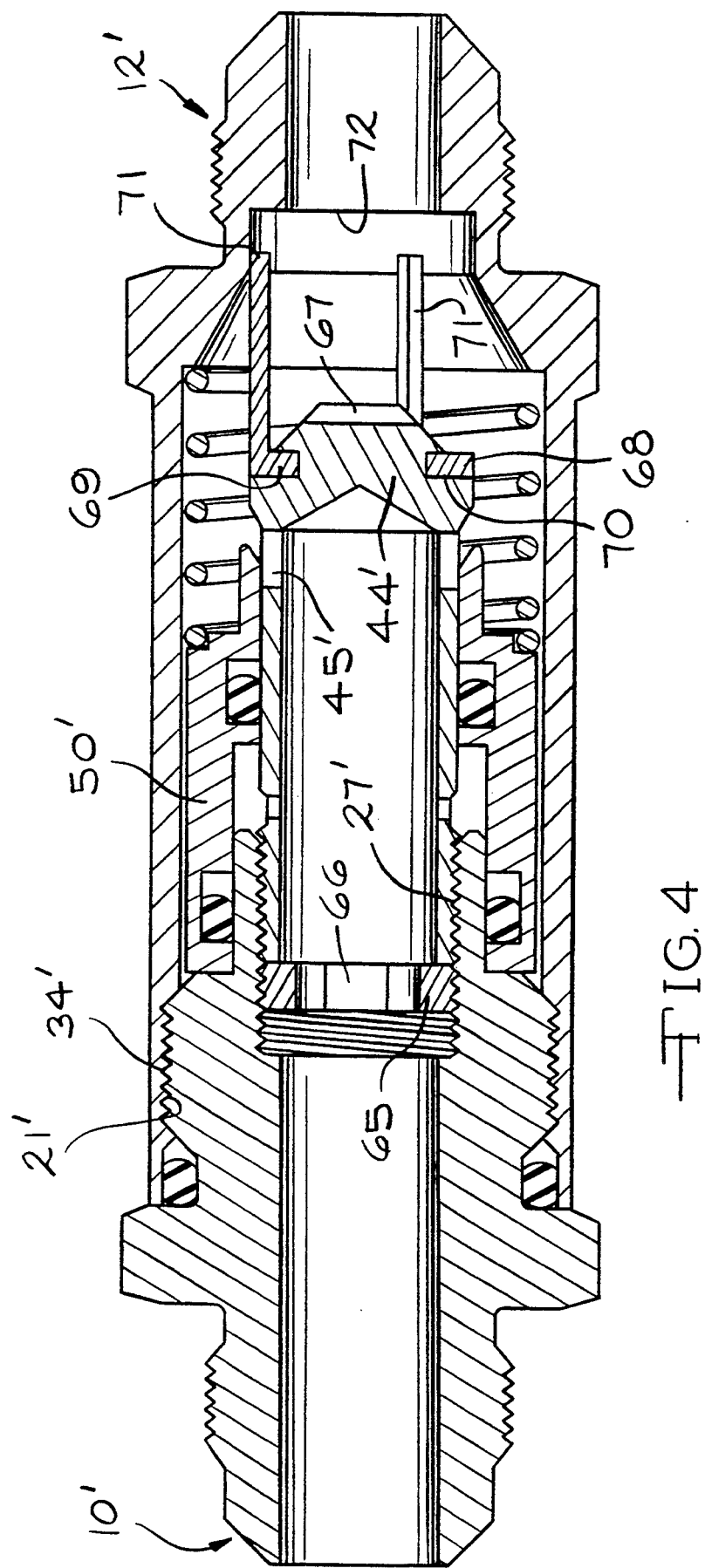
FIG. 4 is a view similar to FIG. 3 showing the fuse in an adjusted position partially closing the main flow ports.

Referring now to FIGS. 3 and 4, there is shown another embodiment in which the hydraulic fuse may be made adjustable to adjust the amount of flow required to cause the slideable sleeve to move to a position closing the outlet ports. The theory behind the feature of partially closing the outlet ports is to increase the pressure drop at any given flow rate, which will cause the hydraulic fuses to be actuated at a lower flow rate. For example, in a given fuse if the outlet ports are fully opened, the flow rate of 25 gpm will cause buildup of pressure sufficient to close the fuse. By adjusting it to partially close the outlet ports the pressure builds to close the fuse which will occur at a much lower flow rate, for example, 15 gpm.

As shown in FIGS. 3 and 4, there is provided an inlet member 10' joined to an outlet member 12' by means of inner engaging threads 21' and 34'. The inlet member 10' is provided with internal threads 27' at its outlet end which are longer than the threads 27 of the embodiment of FIGS. 1 and 2. An adjustable jamb nut 65 having internal hex flats 66 is threadedly engaged to the internal threads 27'.

The fixed guide 40' has formed in its tapered nose cone 44' a laterally extending slot 67 which may be engaged by a screwdriver to rotate the fixed guide 40' from a fully open position shown in FIG. 3 in which the outlet flow ports 45' are fully opened to a position shown in FIG. 4 in which the outlet flow ports 45' are partially closed. As will be appreciated, the rotation of the fixed guide 40' from the fully open position shown in FIG. 3 to the retracted position in which the slideable sleeve 50' partially closes the outlet flow ports 45' can only be accomplished after the jamb nut 65 has been rotated to the left as shown in FIGS. 3 and 4 thereby permitting the fixed guide 40 to be rotated in a direction moving it leftward to the position shown in FIG. 4.

The tapered nose cone 44' is also provided with a leg stop 68 which includes an inwardly directed flange portion 69 engaged in an annular groove 70. Extending in an axial direction from the flange are a plurality of three legs 71 which are positioned to engage an internal inwardly directed radial shoulder 72. The leg stop 68 provides means to prevent further unthreading of the fixed guide when the fixed guide is in its fully extended position as shown in FIG. 3.

Many other modifications will become readily apparent to those skilled in the art. Accordingly, the scope of the present invention should be determined only by the scope of the appended claims.

We claim:

1. A hydraulic fuse comprising:
   (a) a first member extending from a first end to a second end, a passageway extending along an axis from said first end to said second end, said second end defining an outlet;

(b) a second member having a passageway extending along said axis from an inlet to a leading end positioned within said first member first end, said second member engaged to said first member;

(c) a fixed guide having an annular wall with an inlet end joined to said second member leading end, said annular wall defining an axial passageway communicating with said second member passageway and terminating at a closed end wall spaced from said inlet end, said annular wall having exterior surface portions parallel to said axis, a first lateral port in said annular wall in the vicinity of said end wall and a second lateral port in said annular wall axially spaced from said first lateral port;

(d) an axially slideable sleeve mounted on said fixed guide extending from a leading end to a trailing end and having an internal surface slideably engaged to said annular wall for movement from a retracted position at which said leading end is axially spaced from said first lateral port to a forward position at which said leading end overlies said first lateral port, said slideable sleeve having an inwardly facing annular seal sealingly and slideably engaged to said fixed guide exterior surface portions and moveable between said second lateral port and said first lateral port; and (e) a spring yieldingly urging said slideable sleeve toward said retracted position, said spring and said slideable sleeve being responsive to fluid pressure of predetermined magnitude introduced through said second lateral port acting on said annular seal to move it and said slideable sleeve toward said forward position.

2. A hydraulic fuse comprising:

(a) a first member extending from a first end to a second end, a passageway extending along an axis from said first end to said second end, said second end defining an outlet;

(b) a second member having a passageway extending along said axis from an inlet to a leading end positioned within said first member first end, said second member engaged to said first member and having a cylindrical exterior surface;

(c) a fixed guide having an annular wall with an inlet end joined to said second member leading end, said annular wall defining an axial passageway communicating with said second member passageway and terminating at a closed end wall spaced from said inlet end, said annular wall having exterior surface portions parallel to said axis, a first lateral port in said annular wall in the vicinity of said end wall and a second lateral port in said annular wall axially spaced from said first lateral port;

(d) an axially slideable sleeve mounted on said fixed guide having an internal surface slideably engaged to said annular wall for movement from a retracted position axially spaced from said first lateral port to a forward position overlying said first lateral port, said slideable sleeve (1) being slideably engaged to said second member cylindrical exterior surface and (2) having first and second inwardly facing annular seals moveable therewith, said first annular seal sealingly and slidingly engaged to said leading end cylindrical exterior surface and said second annular seal sealingly and slidingly engaged to exterior portions of said fixed guide, said annular seals and the portion of said slideable sleeve lying axially therebetween cooperating with said fixed guide exterior surface to define a chamber communicating with said second lateral port; and (e) a spring yieldingly urging said slideable sleeve toward said retracted position, said spring and said slideable sleeve being responsive to fluid pressure of predetermined magnitude introduced through said second lateral port acting on said slideable sleeve to move it toward said forward position.

3. The hydraulic fuse of claim 1, wherein said fixed guide end wall includes a peripheral portion having a radial extent greater than the radial extent of said fixed guide exterior surface portions, said peripheral portion being engageable by said slideable sleeve to limit the forward movement of said slideable sleeve.

4. The hydraulic fuse of claim 3, wherein said slideable sleeve includes a leading end portion having an inwardly facing, outwardly tapering surface and said peripheral portion is tapered in a mating configuration thereto.

5. The hydraulic fuse of claim 1, wherein said second member leading end has inwardly facing threads and said fixed guide has outwardly facing threads between said second lateral port and said inlet end engaged thereto.

6. A hydraulic fuse comprising:

(a) a first member extending from a first end to a second end, a passageway extending along an axis from said first end to said second end, said second end defining an outlet;

(b) a second member having a passageway extending along said axis from an inlet to a leading end positioned within said first member first end, said second member engaged to said first member;

(c) a fixed guide having an annular wall with an inlet end joined to said second member leading end, said annular wall defining an axial passageway communicating with said second member passageway and terminating at a closed end wall spaced from said inlet end, said annular wall having exterior surface portions parallel to said axis, a first lateral port in said annular wall in the vicinity of said end wall and a second lateral port in said annular wall axially spaced from said first lateral port;

(d) an axially slideable sleeve mounted on said fixed guide having an internal surface slideably engaged to said annular wall for movement from a retracted position axially spaced from said first lateral port to a forward position overlying said first lateral port, said fixed guide being rotatably adjustable on said second member leading end from a forward position at which said first lateral port is fully open to a retracted position at which said first lateral port is partially closed by said slideable sleeve when said sleeve is in its retracted position; and (e) a spring yieldingly urging said slideable sleeve toward said retracted position, said spring and said slideable sleeve being responsive to fluid pressure of predetermined magnitude introduced through said second lateral port acting on said slideable sleeve to move it toward said forward position.

7. The hydraulic fuse of claim 6, wherein said fixed guide closed end wall has a slot engageable through said first member outlet and passageway for effecting rotatable adjustment.

8. The hydraulic fuse of claim 6, wherein said fixed guide has a stop engageable with said first member for limiting the rotation of said fixed guide toward its forward position.

9. The hydraulic fuse of claim 8, wherein said stop includes at least one leg extending in an axial direction from said closed end wall.

10. The hydraulic fuse of claim 6, further including a lock nut having outwardly facing threads engaged to said inwardly facing threads, said lock nut having an internal aperture with flats engageable via said second member inlet and passageway.

11. A hydraulic fuse comprising:
(a) a first member extending from a first end to a second end, a passageway extending along an axis from said first end to said second end, said second end defining an outlet, at least a portion of said passageway being cylindrical;
(b) a second member having a passageway extending along said axis from an inlet to a leading end positioned within said first member first end, said second member engaged to said first member;
(c) a fixed guide having an annular wall with an inlet end joined to said second member leading end, said annular wall defining an axial passageway communicating with said second member passageway and terminating at a closed end wall spaced from said inlet end, a first lateral port in said annular wall in the vicinity of said end wall and a second lateral port in said annular wall axially spaced from said first lateral port, said annular wall having a cylindrical exterior surface of uniform size extending substantially the full distance between said first lateral port and said second lateral port;
(d) an axially slideable sleeve mounted on said fixed guide having an internal surface slideably engaged to said cylindrical exterior surface, said sleeve being moveable from a retracted position axially spaced from said first lateral port to a forward position overlying and closing said first lateral port, said sleeve having an inwardly facing annular seal movable therewith and sealingly and slidingly engaged to said fixed guide cylindrical exterior surface in areas between said first lateral port and said second lateral port; and
(e) a spring yieldingly urging said sleeve toward said retracted position, said spring, said annular seal and said sleeve being responsive to fluid pressure of predetermined magnitude introduced through said second lateral port acting on said inwardly facing annular seal and sleeve to move them toward said forward position.

12. A hydraulic fuse comprising:
(a) a first member extending from a first end to a second end, a passageway extending along an axis from said first end to said second end, said second end defining an outlet, at least a portion of said passageway being cylindrical;
(b) a second member having a passageway extending along said axis from an inlet to a leading end positioned within said first member first end, said second member engaged to said first member;
(c) a fixed guide having an annular wall with an inlet end joined to said second member leading end, said annular wall defining an axial passageway communicating with said second member passageway and terminating at a closed end wall spaced from said inlet end, a first lateral port in said annular wall in the vicinity of said end wall and a second lateral port in said annular wall axially spaced from said first lateral port, said annular wall having a cylindrical exterior surface between said first lateral port and said second lateral port;
(d) an axially slideable sleeve mounted on said fixed guide having an internal surface slideably engaged to said cylindrical exterior surface, said sleeve being moveable from a retracted position axially spaced from said first lateral port to a forward position overlying and closing said first lateral port, said sleeve having an inwardly facing annular seal movable therewith and sealingly and slidingly engaged to said fixed guide cylindrical exterior surface in areas between said first lateral port and said second lateral port; and
(e) a spring yieldingly urging said sleeve toward said retracted position, said spring, said annular seal and said sleeve being responsive to fluid pressure of predetermined magnitude introduced through said second lateral port acting on said annular seal and sleeve to move them toward said forward position, said second member leading end having a cylindrical exterior surface and said slideable sleeve (1) being engaged thereto and (2) having a second inwardly facing annular seal moveable therewith and sealingly and slidingly engaged to said leading end cylindrical exterior surface, said annular seals and the portion of said slideable sleeve lying axially therebetween cooperating with said fixed guide exterior surface to define a chamber communicating with said second lateral port.

13. The hydraulic fuse of claim 11, wherein said fixed guide end wall includes a peripheral portion having a radial extent greater than the radial extent of said fixed guide cylindrical wall, said peripheral portion being engageable by said slideable sleeve to limit the forward movement of said slideable sleeve.

14. The hydraulic fuse of claim 13, wherein said slideable sleeve includes a leading end portion having an inwardly facing, outwardly tapering surface and said peripheral portion is tapered in a mating configuration thereto.

15. The hydraulic fuse of claim 11, wherein said second member leading end has inwardly facing threads and said fixed guide has outwardly facing threads between said second lateral port and said inlet end engaged thereto.

16. A hydraulic fuse comprising:
(a) a first member extending from a first end to a second end, a passageway extending along an axis from said first end to said second end, said second end defining an outlet, at least a portion of said passageway being cylindrical;
(b) a second member having a passageway extending along said axis from an inlet to a leading end position within said first member first end, said second member engaged to said first member and having inwardly facing threads at said leading end;
(c) a fixed guide having an annular wall with an inlet end having outwardly facing threads joined to said second member inwardly facing threads, said annular Wall defining an axial passageway communicating with said second member passageway and terminating at a closed end wall spaced from said inlet end, a first lateral port in said annular wall in the vicinity of said end wall and a second lateral port in said annular wall axially spaced from said first lateral port, said annular wall having a cylindrical exterior surface between said first lateral port and said second lateral port;

(d) an axially slideable sleeve mounted on said fixed guide having an internal surface slideably engaged to said cylindrical exterior surface, said sleeve being moveable from a retracted position axially spaced from said first lateral port to a forward position overlying and closing said first lateral port, said sleeve having an inwardly facing annular seal movable therewith and sealingly and slidingly engaged to said fixed guide cylindrical exterior surface in areas between said first lateral port and said second lateral port; and (e) a spring yieldingly urging said sleeve toward said retracted position, said spring, said annular seal and said sleeve being responsive to fluid pressure of predetermined magnitude introduced through said second lateral port acting on said annular seal and sleeve to move them toward said forward position, said fixed guide being rotatably adjustable on said second member leading end from a forward position at which said first lateral port is fully open to a retracted position at which said first lateral port is partially closed by said slideable sleeve when said sleeve is in its retracted position.

17. The hydraulic fuse of claim 16, wherein said fixed guide closed end wall has a slot engageable through said first member outlet and passageway for effecting rotatable adjustment.

18. The hydraulic fuse of claim 16, wherein said fixed guide has a stop engageable with said first member for limiting the rotation of said fixed guide toward its forward position.

19. The hydraulic fuse of claim 18, wherein said stop includes at least one leg extending in an axial direction from said closed end wall.

20. The hydraulic fuse of claim 11 further including a lock nut having outwardly facing threads engaged to said inwardly facing threads, said lock nut having an internal aperture with fiats engageable via said second member inlet and passageway.

21. A hydraulic fuse comprising:
(a) a housing extending along an axis from an inlet end to an outlet end and a passageway extending therebetween;
(b) a valve member positioned in said passageway, said valve member having a first open end, a second end, an annular wall of substantially uniform size throughout, with a cylindrical outer surface portion, a passage for receiving, at said first open end, fluid introduced from said housing passageway, a lateral wall at said second end blocking the flow of fluid from direct movement along said axis, a first radial port in the vicinity of said lateral wall, said first radial port communicating with said housing outlet end, and a second radial port axially spaced from said first radial port and positioned between said first open end and said first radial port;
(c) a slideable sleeve slideably engaged to said cylindrical outer surface portion, said slideable sleeve moveable axially from a position remote from said first radial port to a position overlying said first radial port;
(d) a compression spring for yieldingly urging said slideable sleeve axially toward said housing inlet end;

(e) a chamber between said valve and said sleeve, said chamber being spaced from said housing;
(f) said second radial port communicating with said chamber and directing fluid under pressure into said chamber to urge said slideable sleeve axially against the biasing action of said compression spring to close said first radial port upon pressure within said chamber reaching a level capable of overcoming the force of said compression spring.

22. The hydraulic fuse of claim 21, wherein said housing includes (1) a first member extending from a first end to said outlet end and (2) a second member extending from said inlet end to a leading end and having connector area between said inlet end and said leading end, said first member engaged to said second member at said connector area.

23. A hydraulic fuse comprising:
(a) a housing extending along an axis from an inlet end to an outlet end and a passageway extending therebetween, said housing including (1) a first member extending from a first end to said outlet end and (2) a second member extending from said inlet end to a leading end and having connector area between said inlet end and said leading end, said first member engaged to said second member at said connector area;
(b) a valve member positioned in said passageway, said valve member having a first open end, a second end, an annular wall with a cylindrical outer surface portion, a passage for receiving, at said first open end, fluid introduced from said housing passageway, a lateral wall at said second end blocking the flow of fluid from direct movement along said axis, a first radial port in the vicinity of said lateral wall, said first radial port communicating with said housing outlet end, and a second radial port axially spaced from said first radial port and positioned between said first open end and said first radial port;
(c) a slideable sleeve slideably engaged to said cylindrical outer surface portion, said slideable sleeve moveable axially from a position remote from said first radial port to a position overlying said first radial port;
(d) a compression spring for yieldingly urging said slideable sleeve axially toward said housing inlet end;
(e) a chamber between said valve and said sleeve;
(f) said second radial port communicating with said chamber and directing fluid under pressure into said chamber to urge said slideable sleeve axially against the biasing action of said compression spring to close said first radial port upon pressure within said chamber reaching a level capable of overcoming the force of said compression spring, said second member leading end having a cylindrical exterior surface and said slideable sleeve (1) being slideably engaged thereto and (2) having first and second inwardly facing annular seals moveable therewith, said first annular seal sealingly and slidingly engaged to said valve member cylindrical outer surface portion and said second annular seal sealingly and slidingly engaged to said leading end cylindrical exterior surface, said annular seals and the portion of said slideable sleeve lying axially therebetween cooperating with said valve cylindrical outer surface portion to define said chamber.

24. The hydraulic fuse of claim 21, wherein said valve member lateral wall includes a peripheral portion having a radial extent greater than the radial extent of said cylindrical outer surface portion said peripheral portion being engageable by said slideable sleeve to limit the forward movement of said slideable sleeve.

25. The hydraulic fuse of claim 24, wherein said slideable sleeve includes a leading end portion having an inwardly facing, outwardly tapering surface and said peripheral portion is tapered in a mating configuration thereto.

26. The hydraulic fuse of claim 22, wherein said second member leading end has inwardly facing threads and said valve has outwardly facing threads between said second lateral port and said first open end engaged thereto.

27. The hydraulic fuse of claim 26, wherein said valve is rotatably adjustable on said second member leading end from a forward position at which said first lateral port is fully open to a retracted position at which said first lateral port is partially closed by said slideable sleeve when said sleeve is in its retracted position.

28. The hydraulic fuse of claim 27, wherein said valve member lateral wall has a slot engageable through said first member outlet and passageway for effecting rotatable adjustment.

29. The hydraulic fuse of claim 27, wherein said valve has a stop engageable with said first member for limiting the rotation of said fixed guide toward its forward position.

30. The hydraulic fuse of claim 29, wherein said stop includes at least one leg extending in an axial direction from said lateral wall.

31. The hydraulic fuse of claim 27 further including a lock nut having outwardly facing threads engaged to said inwardly facing threads, said lock nut having an internal aperture with flats engageable via said second member inlet and passageway.

32. The hydraulic fuse of claim 21, wherein said slideable sleeve is in spaced relationship to said housing to form a gap through which lubricant may flow upon movement of said sleeve.

* * * * *